Figure 3:
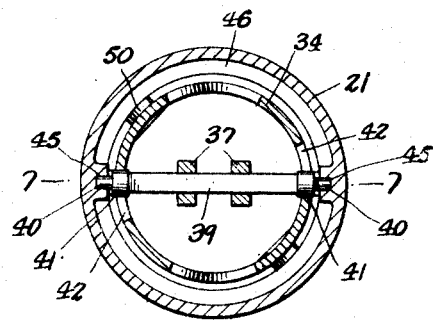

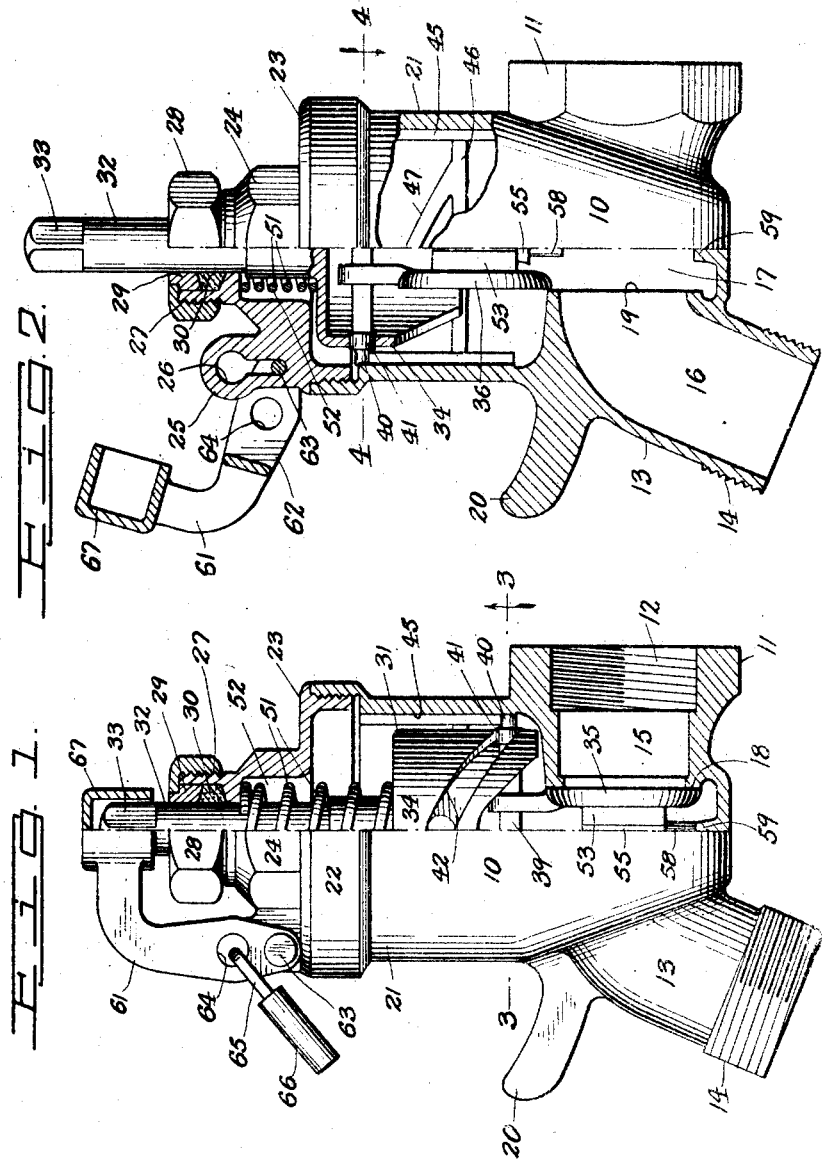

G. R. JERNSTEDT.
VALVE CONSTRUCTION.
APPLICATION FILED JULY 8, 1919.

1,365,694.

Patented Jan. 18, 1921.
2 SHEETS—SHEET 2.

Inventor
George R. Jernstedt,
By his Attorneys
Edgar Tate & Co.

UNITED STATES PATENT OFFICE.

GEORGE R. JERNSTEDT, OF JERSEY CITY, NEW JERSEY.

VALVE CONSTRUCTION.

1,365,694.  Specification of Letters Patent.  Patented Jan. 18, 1921.

Application filed July 8, 1919. Serial No. 309,416.

*To all whom it may concern:*

Be it known that I, GEORGE R. JERNSTEDT, a citizen of the United States, and residing at Jersey City, in the county of Hudson and State of New Jersey, have invented certain new and useful Improvements in Valve Constructions, of which the following is a specification, such as will enable those skilled in the art to which it appertains to make and use the same.

This invention relates to valve constructions and particularly to devices of this class of the gate type designed particularly for use in connection with fuel, gas and oil supply tanks and to serve as a discharge device for such tanks, and the object of the invention is to provide a quick acting valve device of this class which may be fully opened or closed upon a quarter revolution of a valve stem; a further object being to provide a valve device of the class specified which when open will produce a direct and unobstructed passage therethrough; a still further object being to provide means for locking the valve in its closed position against opening; and with these and other objects in view the invention consists in a device of the class and for the purpose specified which is simple in construction and operation and efficient in use.

Figure 4:
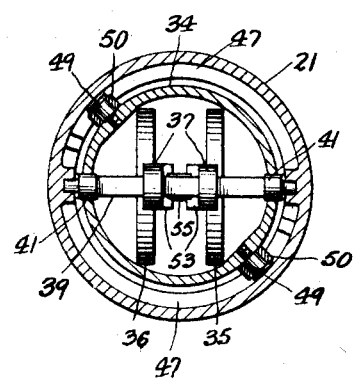
Figure 5:
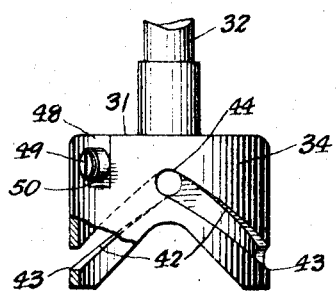
Figure 6:
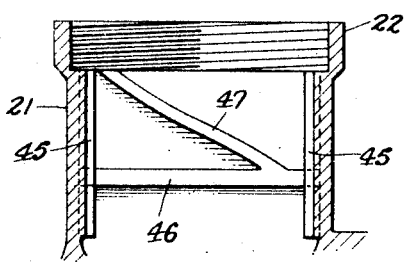
Figure 7:
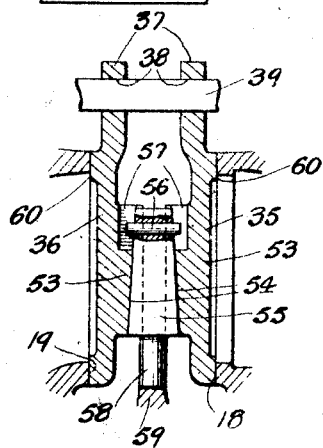

The invention is fully disclosed in the following specification, of which the accompanying drawings form a part, in which the separate parts of my improvement are designated by suitable reference characters in each of the views, and in which:

Figure 1 is a side and sectional view of my improved valve showing the parts in a normal or closed and locked position;

Fig. 2 a view similar to Fig. 1, but showing a different section and with the parts of the valve in an unlocked and open position;

Fig. 3 a partial section on the line 3—3 of Fig. 1;

Fig. 4 a partial section on the line 4—4 of Fig. 2;

Fig. 5 a side and sectional detail view of a part of the construction which I employ showing the same detached;

Fig. 6 a view similar to Fig. 2 showing only a part of the construction; and,

Fig. 7 a partial section on the line 7—7 of Fig. 3 on an enlarged scale and showing the details of the gate valve which I employ.

In Figs. 1 and 2 I have shown at 10 the main body portion of the valve device, said body portion being provided with an outwardly directed hexagonal extension 11 internally threaded as shown at 12 to receive a pipe not shown. At the opposite side of the body portion is an outwardly and downwardly directed tubular extension 13 externally threaded as shown at 14 to receive a coupling or closure cap which is not shown.

Inwardly of the extensions 11 and 13, or where the ports or passages 15 and 16 of said extensions communicate with the bottom chamber 17 of the body portion 10 of the valve device are vertical gate valve seats 18 and 19, which are clearly shown in Figs. 1, 2 and 7 of the drawing.

My improved valve device is designed particularly for use in connection with fuel, gas and oil supply tanks as hereinbefore set out and to serve as a discharge for such tanks, in which event the port or passage 15 serves as the intake port, while the port or passage 16 as the discharge port, and the extension 13 operates as a discharge nozzle. The body portion 10 of the valve device is provided above the extension or nozzle 13 with an outwardly and upwardly directed finger 20 upon which the bail of a pail or other container may rest, if desired, in filling said pail or container with oil or gas discharged through the nozzle 13.

The top or cylindrical portion 21 of the valve device is enlarged as shown at 22 and internally threaded to receive a closure cap 23, which is provided with a central hexagonal portion 24 at one side of which is an upstanding ear 25 provided with a key-shaped aperture 26. The hexagonal portion 24 is provided with an upwardly directed externally threaded sleeve portion 27 upon which is mounted a hexagonal packing or stuffing box nut 28 adapted to hold a collar 29 and packing 30 in place.

A valve member 31 is movably mounted within the body portion 10 of the valve device and comprises a valve stem 32 which passes through the stuffing box at the top of the body portion 10, the top of said stem being square in form as shown at 33 and the bottom of said stem being provided with an enlarged sleeve cam portion 34 with which two gate valves 35 and 36 are connected and by means of which said gate valves are given their movement.

The gate valves 35 and 36 are disk-shaped in form and are each provided with upwardly directed ears 37 having angular or square apertures 38 through which a square shaft 39 passes, said shaft being provided at its opposite end portions with outwardly directed trunnions 40 upon which are rotatably mounted rollers 41, which operate in cam apertures 42 in the sleeve cam portion 34. These apertures 42 each extend upwardly at an angle to the vertical line of the sleeve and about one-quarter of the circumference of said sleeve as clearly shown in Fig. 5 of the drawing, the bottom of said apertures terminating at 43 and the top thereof at 44.

The opposite side walls of the body portion 10, or the cylindrical top portion 21 thereof is provided on its inner face with vertical grooves 45 in which the trunnions 40 of the shaft 39 operate, in the vertical movement of the valve member 31. The inner face of the cylindrical portion 21 is also provided approximately, centrally thereof with an annular enlarged portion 46 which forms a bearing face for the sleeve 34 and on the opposite sides of said cylindrical portion 21 to that of the groved sides of said portion are vertical and angularly arranged tracks or runways 47, one of which is clearly shown in Fig. 6 of the drawing, and these runways also serve as bearing faces for the sleeve 34 in its movement.

The sleeve 34 is provided adjacent to the top thereof and on opposite sides with flattened portions 48 in connection with which are secured headed screws 49 on which are mounted anti-friction rollers 50 which are adapted to operate in connection with the runways 47 in the vertical movement of the valve member 31 as hereinafter described.

A spiral spring 51 is mounted on the stem 32 of the valve member 31 and bears on the top of the cam sleeve portion 34 and also operates in an apertured portion 52 within the hexagonal portion 24 of the cap 23 as clearly shown in Figs. 1 and 2.

The gate valves 35 and 36 are provided centrally of the back portion thereof with vertically arranged enlargements 53, the inner or abutting faces of which are tapered as shown at 54 to receive a tapered wedge 55, the upper end of which is provided with a transverse pin 56 which extends through the opposite sides of the wedge into vertically arranged apertures 57, and this pin 56 serves to guide the wedge in its operation in connection with the gate valves 35 and 36, and also serves to hold said wedge in connection with said gate valves at all times or in the different positions of the valve member 31. The wedge 55 is provided with a downwardly directed central extension 58, which operates in connection with an upwardly directed stud 59 centrally of the chamber 17 in the body portion 10 of the valve device, as clearly shown in Figs. 1, 2 and 7 of the drawing.

It will be noted that when the gate valves 35 and 36 are moved downwardly by the sleeve cam portion 34, the wedge member 55 strikes the stud 59 and the gate valves 35 are wedged outwardly to bring the faces 60 of said valves in connection with the valve seats 18 and 19 to close the communication between the chambers 15 and 16 as will be understood.

The valve member 31 or the gate valves 35 and 36 carried thereby are moved from the closed to the fully open position upon one-quarter of a revolution of the valve stem 32, this result being accomplished by a suitable wrench placed on the square end 33 of said stem. The valve stem 32 is held sealed and against manipulation by an L-shaped lever 61, which is forked at one end as shown at 62 and pivotally connected with the key-aperture 26 in the ear 25 by a pin 63 passed through said key aperture. The forked portion 62 of the lever 61 is provided with apertures 64 which are adapted to register with the key-shaped aperture 26 as shown in Fig. 1 to permit the passage of the shackle 65 of a padlock 66 therethrough to lock the lever 61 against movement on the cap 23.

The other or free end of the lever 61 is formed into a cup-shaped sleeve 67 which is adapted to pass over and inclose the top square portion 33 of the valve stem 32 thus preventing the rotary and vertical movement of said stem when the lever is in its locked position.

In the use of the device, when it is desired to open the valve from the position shown in Fig. 1 to that shown in Fig. 2, the padlock 66 is first opened and removed from the lever 61, after which said lever is moved into the position shown in Fig. 2 and a suitable wrench placed upon the square end 33 of the stem 32 of the valve member 31, and said stem is then given a one-quarter turn or revolution; this operation rotates the sleeve cam portion 34 one-quarter of a revolution which, as will be apparent, raises the shaft 39 in said cam portion 34, and the rollers 41 on the end portions of said shaft move upwardly in the cam apertures 42 into the position shown in Fig. 2, in which operation the gate valves 35 and 36 are raised into the position shown in said figure. It will also be apparent that, in addition, to raising the gate valves 35 and 36 to the extent of the lift of the shaft 39 in the sleeve cam portion 34, said sleeve cam portion is also raised in the cylindrical portion 21 of the valve by the anti-friction rollers 50 operating upon the tracks or runways 47 thus doubling the vertical movement actually given to the shaft 39, to raise the gate valves 35 and 36. In other words, if the gate valves were raised by the upward movement of the shaft 39 in the sleeve alone or independent of the upward movement of said sleeve, the valve would only half open. It will therefore be seen that the gate valves 35 and 36 are moved from their closed to their fully open position by the combined action of the shaft 39 in the sleeve 34 and the vertical movement of the sleeve 34 in the cylindrical portion 21 of the valve device.

The spiral spring 51 is compressed or put under tension by raising the sleeve 34, as above set out, and the wrench or other tool employed for turning the valve stem 32 must be kept in position to hold the valve in its open position, and by releasing the wrench employed, or detaching it from the square end 33 of said stem, the valve member 31 will automatically be moved downwardly to again close the gate valves 35 and 36 by the action of the spring 51.

It will be seen from the foregoing that my improved valve device is quick in action both in opening and closing the same and is closed automatically through a tensional device, and it will be apparent that while I have shown a specific design of valve body to illustrate one use of my improvement, my invention is not necessarily limited to this construction nor to other details of construction shown, and various changes in and modifications of the construction herein shown and described may be made, within the scope of the appended claims, without departing from the spirit of my invention or sacrificing its advantages, and while I have specified a particular use for my improved valve device, it will be apparent that my invention is not limited to such use and the said valve device may be used for many purposes other than those herein set out.

Having fully described my invention, what I claim as new and desire to secure by Letters Patent, is:—

1. A valve device of the class described comprising a body portion provided with intake and exhaust ports or passages, gate valves for controlling the communication between said passages, a sleeve cam mounted in said body portion and provided with a valve stem which extends through said body portion, a shaft movably mounted in said sleeve cam transversely thereof and adapted to support said gate valves, and means whereby a partial revolution of said valve stem will raise said gate valves to fully open the communication between said ports or passages.

2. A valve device of the class described comprising a body portion provided with intake and exhaust ports or passages, gate valves for controlling the communication between said passages, a sleeve cam mounted in said body portion and provided with a valve stem which extends through said body portion, a shaft mounted in said sleeve cam and adapted to support said gate valves, means whereby a partial revolution of said valve stem will raise said gate valves to fully open the communication between said ports or passages, tensional means for moving said sleeve cam and said gate valves into their closed position, and a wedge member carried by and adapted to coöperate with said gate valves to automatically close the same in the downward movement of said gate valves.

3. A valve device of the class described comprising a body portion provided with intake and exhaust ports or passages, gate valves for controlling the communication between said passages, a sleeve cam mounted in said body portion and provided with a valve stem which extends through said body portion, a shaft mounted in said sleeve cam and adapted to support said gate valves, means whereby a one-quarter revolution of said valve stem will raise said gate valves to fully open the communication between said ports or passages, tensional means for moving said sleeve cam and said gate valves into their closed position, a wedge member carried by and adapted to coöperate with said gate valves to automatically close the same in the downward movement of said gate valves, and means coöperating with the protruding end of said valve stem for locking said valve device against usage.

4. A valve device of the class described comprising a body portion provided with intake and discharge ports or passages, gate valves for controlling the communication between said ports or passages, said body portion being cylindrical in form at one end, a closure cap detachably secured to said cylindrical end of the body portion, a valve stem slidably mounted in said closure cap and protruding beyond said cap, a sleeve cam carried by said valve stem within said cylindrical portion, a transverse shaft mounted in said sleeve cam, means for connecting said gate valves with said shaft, means whereby a one-quarter revolution of said valve stem will raise said shaft in said sleeve cam, means for raising said sleeve cam in said cylindrical portion one-quarter revolution, tensional means for automatically operating said sleeve cam and gate valves in one direction, and a wedge member carried by and movably mounted between said gate valves for automatically closing the same.

5. A valve device of the class described comprising a body portion provided with intake and exhaust ports or passages, gate valves for controlling the communication between said ports or passages, a sleeve mounted in said body portion and provided with a valve stem which extends through said body portion, said sleeve being provided with a plurality of cam-shaped apertures, a shaft movably mounted in the cam-shaped apertures of said sleeve and adapted to support said gate valves, means for permitting of the vertical movement of said shaft in said body portion, and means in said body portion and in connection with which said sleeve operates to raise said sleeve a predetermined distance in a partial revolution thereof in which operation said gate valves are raised in said sleeve.

6. In a valve device of the class described having intake and discharge ports or passages, a rotatable valve member, a valve element carried by said member, said valve element coöperating with and adapted to control said intake and discharge ports or passages, and means on said valve member and valve element and in the body of the valve device, whereby a one-quarter turn of said valve member will actuate said valve element to fully open the same.

7. In a valve device of the class described having intake and discharge ports or passages, a rotatable valve member, a valve element carried by said member, said valve element coöperating with and adapted to control said intake and discharge ports or passages, means on said valve member and valve element and in the body of the valve device, whereby a one-quarter turn of said valve member will actuate said valve element to fully open the same, and means for automatically operating said valve member and said valve element to move the same from an open to a closed position.

8. In a valve device of the class described having intake and discharge ports or passages, a valve member, valve elements carried by said member, said valve elements being adapted to control the communication between said intake and discharge ports or passages, an operating shaft on said valve member, and means whereby a one-quarter turn of said shaft will give said valve member a combined rotary and reciprocating movement to move said valve elements from a closed to a fully open position.

9. In a valve device of the class described having intake and discharge ports or passages, a valve member, valve elements carried by said member, said valve elements being adapted to control the communication between said intake and discharge ports or passages, an operating shaft on said valve member, means whereby a one-quarter turn of said shaft will give said valve member a combined rotary and reciprocating movement to move said valve elements from a closed to a fully open position, and means involving a tensional device for automatically moving said valve elements from their open to their closed position.

In testimony that I claim the foregoing as my invention I have signed my name in presence of the subscribing witnesses this 7th day of July, 1919.

GEORGE R. JERNSTEDT.

Witnesses:
C. E. MULREANY,
CH. THOMAS.